United States Patent
Chin et al.

(10) Patent No.: US 9,325,270 B2
(45) Date of Patent: Apr. 26, 2016

(54) DRIVING CIRCUIT FOR VIBRATION MOTOR AND DRIVING METHOD FOR VIBRATION MOTOR

(71) Applicant: Silicon Touch Technology Inc., Hsin-Chu (TW)

(72) Inventors: Chi-Yuan Chin, Taipei (TW); Yu-Chun Chuang, Hsinchu County (TW)

(73) Assignee: Silicon Touch Technology Inc., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/888,377

(22) Filed: May 7, 2013

(65) Prior Publication Data
US 2014/0306625 A1    Oct. 16, 2014

(30) Foreign Application Priority Data
Apr. 15, 2013 (EP) ..................................... 13001951

(51) Int. Cl.
| H02P 7/00 | (2006.01) |
| G05B 19/10 | (2006.01) |
| H02P 25/02 | (2006.01) |
| H02P 6/08 | (2006.01) |
| G05B 19/416 | (2006.01) |

(52) U.S. Cl.
CPC ................. *H02P 25/027* (2013.01); *H02P 6/08* (2013.01); *G05B 19/416* (2013.01)

(58) Field of Classification Search
CPC ................. G05B 11/28; G05B 19/416; G05B 2219/41025; G05B 2219/43006; H03K 7/08; H02P 2007/0005; H02P 2007/0011; H02P 2007/0066; H02P 2007/0077; H02P 2007/0088; H02P 25/027; H02P 6/08; H02P 6/002

USPC .................................... 318/128, 445; 332/109
See application file for complete search history.

(56) References Cited

U.S. PATENT DOCUMENTS

| 5,146,143 | A  * | 9/1992 | Furutsu ................... H02N 2/14 310/316.02 |
| 5,616,979 | A  * | 4/1997 | Nishikawa ............... H02N 2/14 310/316.02 |
| 5,955,799 | A  * | 9/1999 | Amaya et al. ................... 310/36 |
| 6,906,488 | B2 * | 6/2005 | Hayashi ............... G05B 19/416 318/567 |

(Continued)

FOREIGN PATENT DOCUMENTS

| EP | 1 499 007 A1 | 1/2005 |
| KR | 902354 B1 * | 6/2009 |

(Continued)

*Primary Examiner* — Bentsu Ro
*Assistant Examiner* — Zemenay Truneh
(74) *Attorney, Agent, or Firm* — Winston Hsu; Scott Margo

(57) ABSTRACT

The present invention provides a driving circuit for a vibration motor and a driving method for the vibration motor. The driving circuit comprises: a detecting unit, coupled to the vibration motor, for detecting rotating position and rotating speed of the vibration motor and accordingly generating a detecting result; and a control unit, coupled to the detecting unit and the vibration motor, for controlling acceleration and deceleration of the vibration motor according to the detecting result. The driving method comprises: providing a detecting unit for detecting rotating position and rotating speed of the vibration motor and accordingly generating a detecting result; and providing a control unit for controlling acceleration and deceleration of the vibration motor according to the detecting result.

17 Claims, 6 Drawing Sheets

(56) References Cited

U.S. PATENT DOCUMENTS

| | | |
|---|---|---|
| 2002/0121870 A1 | 9/2002 | Inoue |
| 2005/0046363 A1* | 3/2005 | Yamamoto ............ H02P 25/027 318/114 |
| 2009/0251095 A1 | 10/2009 | Miyauchi |
| 2011/0279068 A1 | 11/2011 | Murata |
| 2012/0068634 A1* | 3/2012 | Klemm et al. ................ 318/128 |
| 2012/0133308 A1* | 5/2012 | Elenga .................. H02P 25/027 318/128 |
| 2012/0146562 A1* | 6/2012 | Takeuchi ....................... 318/445 |
| 2013/0257333 A1* | 10/2013 | Kataoka ................ H02P 25/027 318/503 |

FOREIGN PATENT DOCUMENTS

| | | |
|---|---|---|
| TW | 200513099 | 4/2005 |
| TW | 200922103 | 5/2009 |
| TW | 201108592 | 3/2011 |
| TW | 201230731 | 7/2012 |

* cited by examiner

US 9,325,270 B2

DRIVING CIRCUIT FOR VIBRATION MOTOR AND DRIVING METHOD FOR VIBRATION MOTOR

BACKGROUND OF THE INVENTION

1. Field of the Invention

The present invention relates to a driving circuit and a driving method, and more particularly, to a driving circuit for a vibration motor and a driving method for the vibration motor.

2. Description of the Prior Art

In general, the conventional method for making a vibration motor have larger vibration force is performed by increasing mass or rotating radius of the vibration motor. However, the conventional method of increasing mass or rotating radius of the vibration motor also increase the start-up time of the vibration motor, or even make the vibration motor fail in start-up.

In addition, in China Patent No. CN 2786857Y, a fan motor with a vibration function is disclosed. However, this conventional fan motor requires an additional eccentric magnetic pole to have the vibration function, and this makes a higher hardware cost.

SUMMARY OF THE INVENTION

It is therefore one of the objectives of the present invention to provide a driving circuit for a vibration motor and a driving method for the vibration motor, and the driving circuit and the driving method are capable of making the vibration motor have larger vibration force without increasing mass or rotating radius of the vibration motor, so as to solve the above problem.

In accordance with an embodiment of the present invention, a driving circuit for a vibration motor is disclosed. The driving circuit comprises: a detecting unit, coupled to the vibration motor, for detecting rotating position and rotating speed of the vibration motor and accordingly generating a detecting result; and a control unit, coupled to the detecting unit and the vibration motor, for controlling acceleration and deceleration of the vibration motor according to the detecting result.

In accordance with an embodiment of the present invention, a driving method for a vibration motor is disclosed. The driving method comprises: providing a detecting unit for detecting rotating position and rotating speed of the vibration motor and accordingly generating a detecting result; and providing a control unit for controlling acceleration and deceleration of the vibration motor according to the detecting result.

Briefly summarized, the driving circuit and the driving method disclosed by the present invention are capable of making the vibration motor have larger vibration force without increasing mass or rotating radius of the vibration motor.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . ." The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
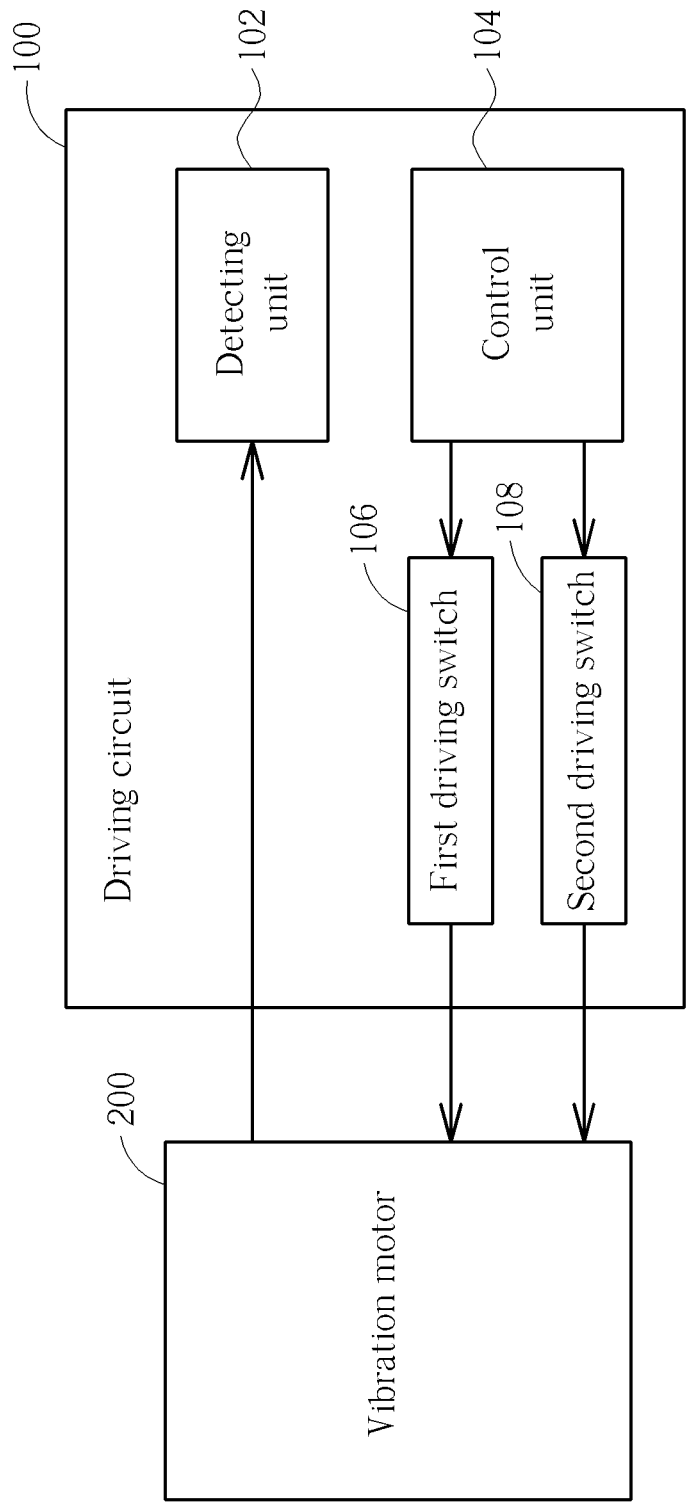
FIG. 1 shows a simplified block diagram of a driving circuit for a vibration motor in accordance with an embodiment of the present invention.

Please refer to FIG. 1. FIG. 1 shows a simplified block diagram of a driving circuit 100 for a vibration motor 200 in accordance with an embodiment of the present invention. As shown in FIG. 1, the driving circuit 100 comprises: a detecting unit 102, a control unit 104, a first driving switch 106, and a second driving switch 108. The detecting unit 102 is coupled to the vibration motor 200, and utilized for detecting rotating position and rotating speed of the vibration motor 200 and accordingly generating a detecting result. The control unit 104 is coupled to the detecting unit 102 and the vibration motor 200, and utilized for controlling acceleration and deceleration of the vibration motor 200 according to the detecting result. The first driving switch 106 and the second driving switch 108 are coupled between a power terminal of the vibration motor 200 and the control unit 104. The control unit 104 controls the vibration motor 200 to cyclically accelerate and decelerate according to the detecting result, wherein the detecting result includes detected rotating positions corresponding to specific rotating angles of the vibration motor 200. Herein, please note that the above embodiment is only for an illustrative purpose and is not meant to be a limitation of the present invention. For example, the vibration motor 200 can have single coil with two inverters. In addition, when the vibration motor 200 does not have an eccentric structure (such as a fan), the detecting result does not include detected rotating positions corresponding to specific rotating angles of the vibration motor 200.

Figure 2:
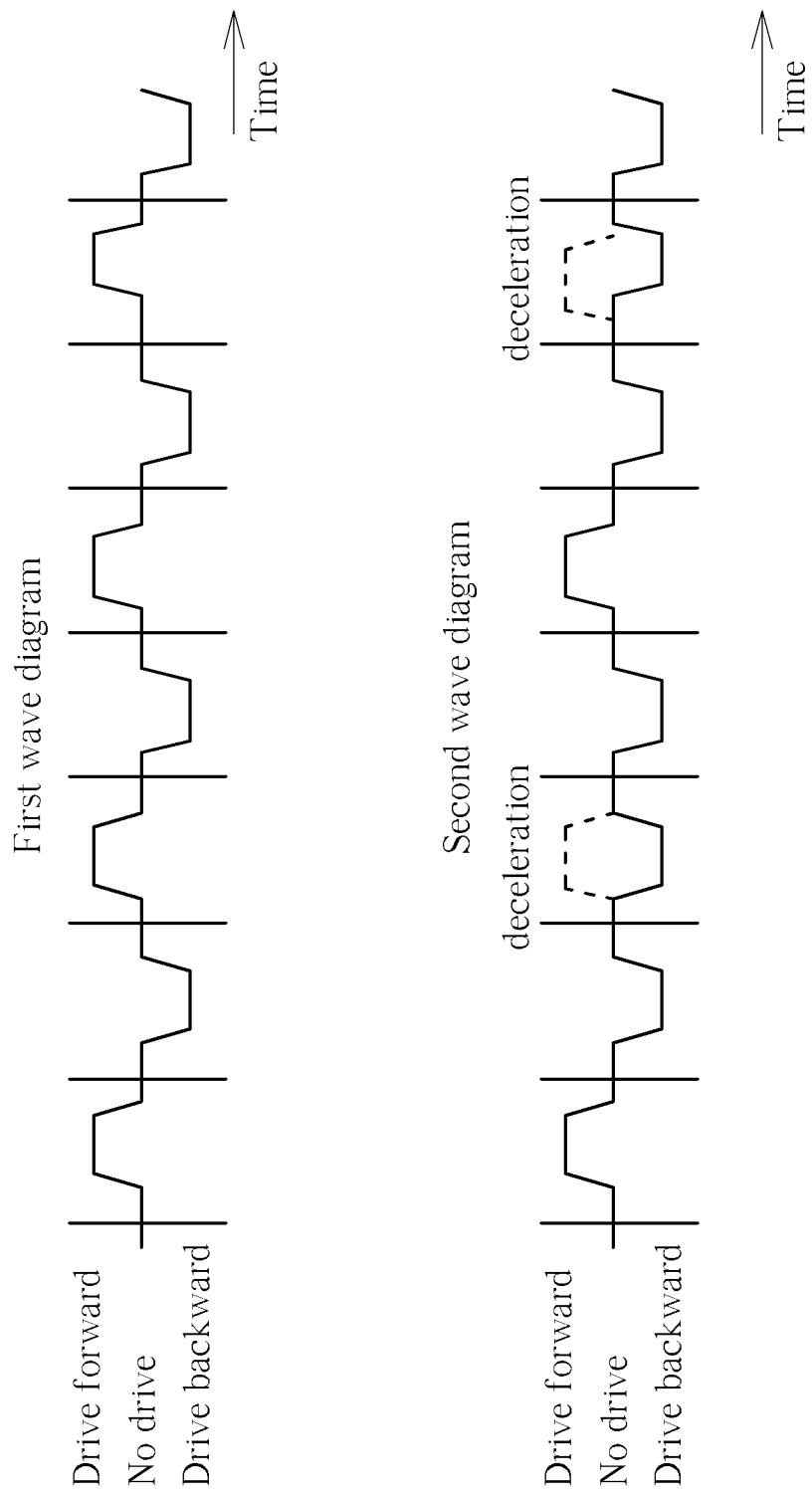
FIG. 2 shows a first driving wave diagram and a second driving wave diagram of the driving circuit.

For example, please refer to FIG. 2. FIG. 2 shows a first driving wave diagram and a second driving wave diagram of the driving circuit 100. The first driving wave diagram shows a normal operation mode of the driving circuit 100, and the second driving wave diagram shows a first vibration mode of the driving circuit 100. As shown in FIG. 2, when the driving circuit 100 drives forward, the control unit 104 controls the vibration motor 200 to accelerate, and when the driving circuit 100 drives backward, the control unit 104 controls the vibration motor 200 to decelerate, and when the driving circuit 100 does not drive, the control unit 104 does not control the vibration motor 200 to accelerate or decelerate. The difference between the normal operation mode and the first vibration mode of the driving circuit 100 is that at a specific period, the driving circuit 100 drives forward (i.e. the control unit 104 controls the vibration motor 200 to accelerate) in the normal operation mode and the driving circuit 100 drives backward (i.e. the control unit 104 controls the vibration motor 200 to decelerate) in the first vibration mode, as shown in FIG. 2. Or, at another specific period, the driving circuit 100 drives forward (i.e. the control unit 104 controls the vibration motor 200 to accelerate) in the normal operation mode and the driving circuit 100 drives backward with difference phase (i.e. the control unit 104 controls the vibration motor 200 to decelerate at difference timing) in the first vibration mode, as shown in FIG. 2. In addition, the deceleration periods shown in FIG. 2 can be varied according to centroid of a base (not shown) connected to the vibration motor 200. For example, the deceleration periods can be changed to first and fifth phases from third and seventh phases shown in FIG. 2 when there is difference or change about centroid of the base.

Figure 3:
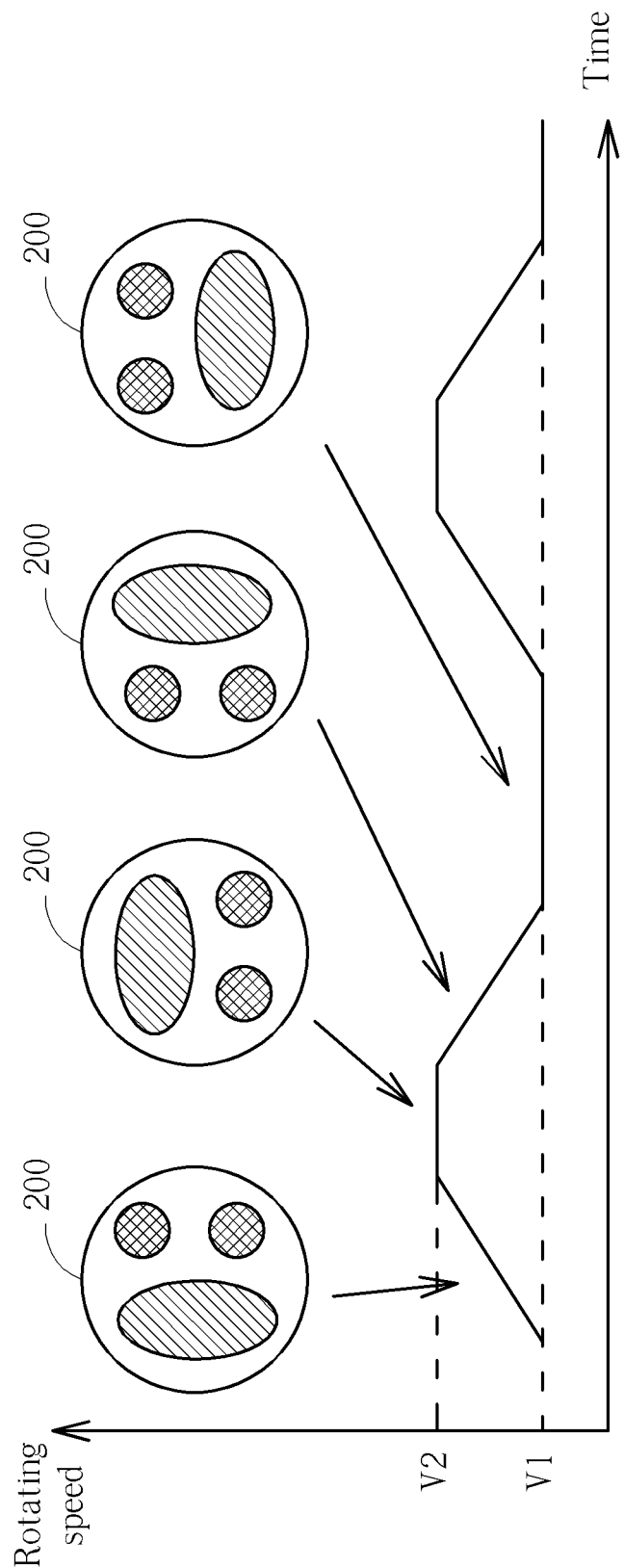
FIG. 3 shows a simplified timing diagram of the acceleration and deceleration of the vibration motor during an operating period of the vibration motor in accordance with an embodiment of the present invention.

For example, please refer to FIG. 3. FIG. 3 shows a simplified timing diagram of the acceleration and deceleration of the vibration motor 200 during an operating period of the vibration motor 200 in accordance with an embodiment of the present invention, and FIG. 3 can be a integration result of the second driving wave diagram in FIG. 2. As shown in FIG. 3, when the detecting unit 102 detects that the vibration motor 200 is at a first rotating position and a first rotating speed V1 and accordingly generating a first detecting result, the control unit 104 controls the vibration motor 200 to accelerate by switching on the first driving switch 106. Next, when the detecting unit 102 detects that the vibration motor 200 is at a second rotating position and a second rotating speed V2 and accordingly generating a second detecting result, the control unit 104 controls the vibration motor 200 to stop the acceleration by switching off the first driving switch 106. Next, when the detecting unit 102 detects that the vibration motor 200 is at a third rotating position and the second rotating speed V2 and accordingly generating a third detecting result, the control unit 104 controls the vibration motor 200 to decelerate by switching on the second driving switch 108. Next, when the detecting unit 102 detects that the vibration motor 200 is at a fourth rotating position and the first rotating speed V1 and accordingly generating a fourth detecting result, the control unit 104 controls the vibration motor 200 to stop the deceleration by switching off the second driving switch 108. In this way, the vibration motor 200 can have larger vibration force without increasing mass or rotating radius of the vibration motor 200, wherein the vibration motor 200 have larger vibration force especially at specific directions corresponding to the acceleration.

Figure 4:
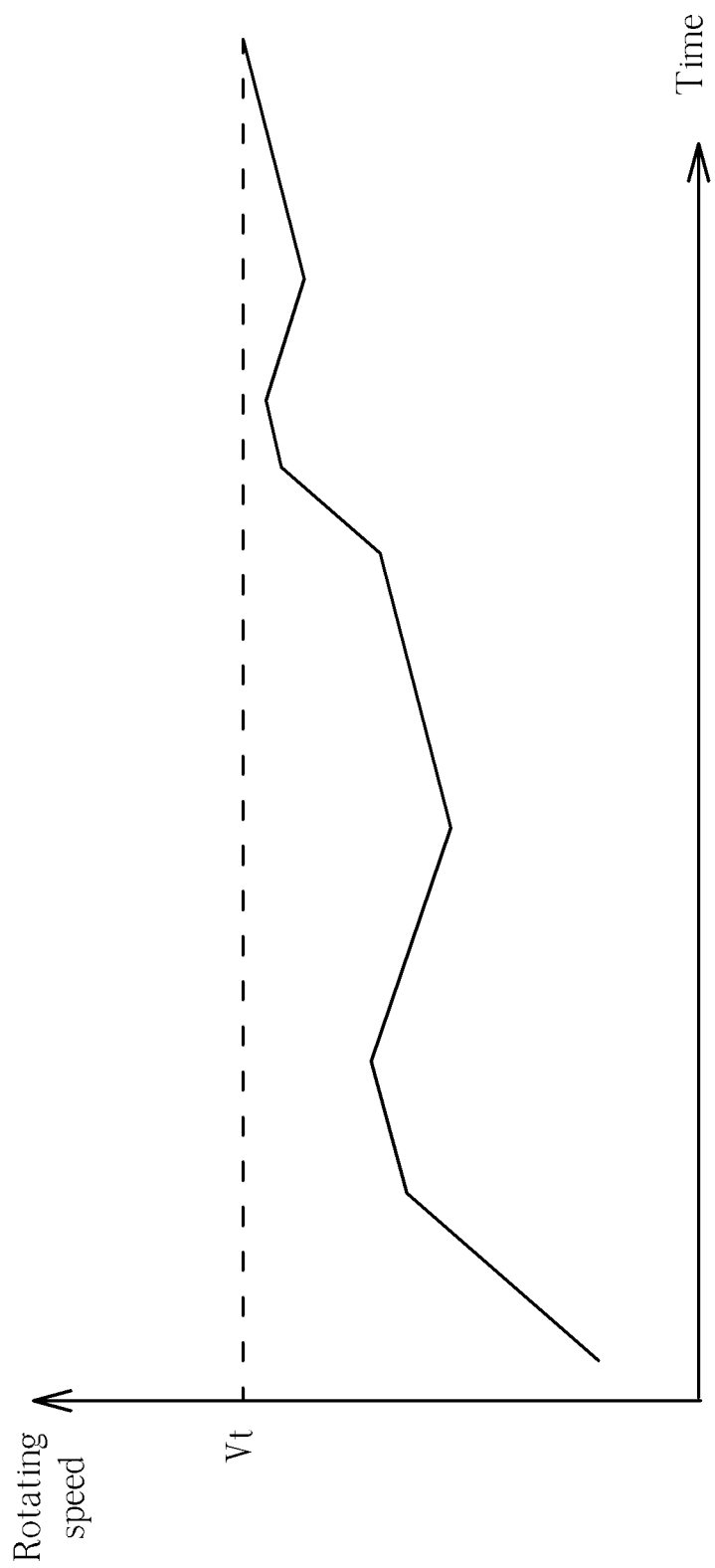
FIG. 4 shows a simplified timing diagram of the acceleration and deceleration of the vibration motor during a start-up period of the vibration motor in accordance with an embodiment of the present invention.

In addition, please refer to FIG. 4. FIG. 4 shows a simplified timing diagram of the acceleration and deceleration of the vibration motor 200 during a start-up period of the vibration motor 200 in accordance with an embodiment of the present invention. As shown in FIG. 4, the control unit 104 controls the acceleration and deceleration of the vibration motor 200 (i.e. the control unit 104 controls the vibration motor 200 to cyclically accelerate and decelerate according to the detecting result) to make a rotating speed of the vibration motor 200 gradually increased to a target rotating speed value Vt. Please note that the above embodiment is only for an illustrative purpose and is not meant to be a limitation of the present invention. For example, when the vibration motor 200 does not have an eccentric structure (such as a fan), and during a start-up period of the vibration motor 200, the control unit 104 controls the acceleration and deceleration of the vibration motor 200 to make a rotating speed of the vibration motor 200 gradually decreased to a target rotating speed value.

Figure 5:
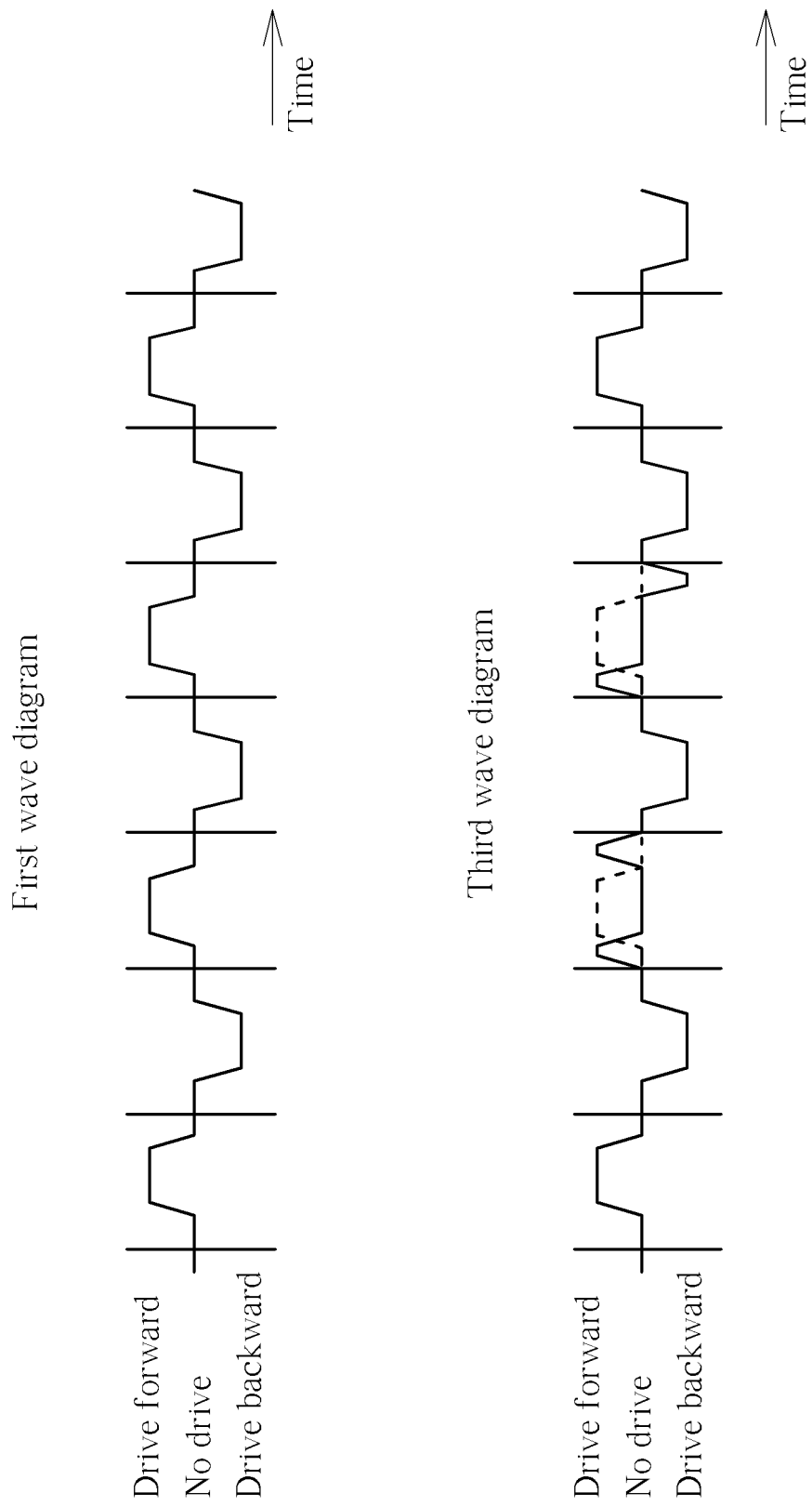
FIG. 5 shows the first driving wave diagram and a third driving wave diagram of the driving circuit 100 with the additional force at vertical directions.

Please note that the above embodiment is only for an illustrative purpose and is not meant to be a limitation of the present invention. For example, the driving circuit 100 can further comprise an inductor for making the vibration motor 200 have an additional force at vertical directions, which the vibration motor of the prior art does not have. For example, please refer to FIG. 5. FIG. 5 shows the first driving wave diagram and a third driving wave diagram of the driving circuit 100 with the additional force at vertical directions. The first driving wave diagram shows the normal operation mode of the driving circuit 100, and the third driving wave diagram shows a second vibration mode of the driving circuit 100. As shown in FIG. 5, when the driving circuit 100 drives forward, the control unit 104 controls the vibration motor 200 to accelerate, and when the driving circuit 100 drives backward, the control unit 104 controls the vibration motor 200 to decelerate, and when the driving circuit 100 does not drive, the control unit 104 does not control the vibration motor 200 to accelerate or decelerate. The difference between the normal operation mode and the second vibration mode of the driving circuit 100 is that at a specific period, the driving circuit 100 drives forward at a normal phase (i.e. the control unit 104 outputs a driving signal to the vibration motor 200 at the normal phase) in the normal operation mode and the driving circuit 100 drives forward at an early phase and a late phase (i.e. the control unit 104 outputs two same driving signals to the vibration motor 200 at the early phase and the late phase) to make use of the phase position to produce a vertical force in the second vibration mode, as shown in FIG. 5. Or, at another specific period, the driving circuit 100 drives forward at the normal phase (i.e. the control unit 104 outputs a driving signal to the vibration motor 200 at the normal phase) in the normal operation mode and the driving circuit 100 drives forward at the early phase and drives backward at the late phase (i.e. the control unit 104 outputs two different driving signals to the vibration motor 200 at the early phase and the late phase) to make use of the phase position to produce a vertical force in the second vibration mode, as shown in FIG. 5.

Figure 6:
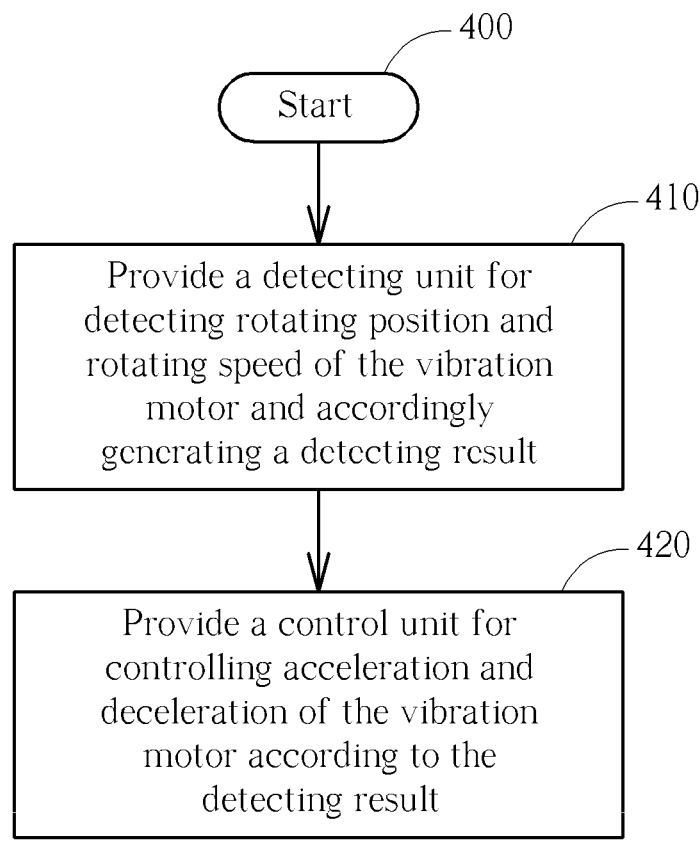
FIG. 6 is a flowchart showing a driving method for a vibration motor in accordance with the operation schemes of the driving circuit in FIG. 1 of the present invention.

Please refer to FIG. 6. FIG. 6 is a flowchart showing a driving method for a vibration motor in accordance with the above operation schemes of the driving circuit 100 of the present invention. Provided that substantially the same result is achieved, the steps of the process flowchart need not be in the exact order shown in FIG. 6 and need not be contiguous, that is, other steps can be intermediate. The driving method of the present invention comprises the following steps:

Step 400: Start.
Step 410: Provide a detecting unit for detecting rotating position and rotating speed of the vibration motor and accordingly generating a detecting result; and
Step 420: Provide a control unit for controlling acceleration and deceleration of the vibration motor according to the detecting result.

In the above flowchart of the present invention, the driving method of the present invention can further comprise: providing a plurality of driving switches coupled between a power terminal of the vibration motor and the control unit, wherein the step of controlling the acceleration and deceleration of the vibration motor controls the acceleration and deceleration of the vibration motor by controlling the driving switches according to the detecting result.

Please note that the above embodiment is only for an illustrative purpose and is not meant to be a limitation of the present invention. For example, the detecting result can include detected rotating positions corresponding to specific rotating angles of the vibration motor. In addition, when the vibration motor 200 does not have an eccentric structure (such as a fan), the detecting result does not include detected rotating positions corresponding to specific rotating angles of the vibration motor 200. Moreover, the step of controlling acceleration and deceleration of the vibration motor can comprise controlling the vibration motor to cyclically accelerate and decelerate according to the detecting result. In addition, during a start-up period of the vibration motor, the step of controlling acceleration and deceleration of the vibration motor controls the acceleration and deceleration of the vibration motor to make a rotating speed of the vibration motor gradually increased to a target rotating speed value. During an operating period of the vibration motor, the step of controlling acceleration and deceleration of the vibration motor controls the acceleration and deceleration of the vibration motor to make a rotating speed of the vibration motor alternately switched between a first rotating speed value and a second rotating speed value.

Briefly summarized, the driving circuit and the driving method disclosed by the present invention are capable of making the vibration motor have larger vibration force without increasing mass or rotating radius of the vibration motor. In addition, in comparison with China Patent No. CN 2786857Y, the driving circuit and the driving method disclosed by the present invention do not require an additional eccentric magnetic pole to have the vibration function, and thus the present invention can reduce hardware cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A driving circuit for a vibration motor, comprising:
   a detecting unit, coupled to the vibration motor, for detecting rotating position and rotating speed of the vibration motor and accordingly generating a detecting result; and
   a control unit, coupled to the detecting unit and the vibration motor, for controlling acceleration and deceleration of the vibration motor according to the detecting result;
   wherein the driving circuit has a normal operation mode and a vibration mode, the difference between the normal operation mode and the vibration mode of the driving circuit is that at a first specific period, the driving circuit drives acceleration in the normal operation mode and the driving circuit drives deceleration in the vibration mode.
2. The driving circuit of claim 1, wherein the control unit controls the vibration motor to cyclically accelerate and decelerate according to the detecting result.
3. The driving circuit of claim 2, wherein during a start-up period of the vibration motor, the control unit controls the acceleration and deceleration of the vibration motor to make a rotating speed of the vibration motor gradually increased to a target rotating speed value.
4. The driving circuit of claim 2, wherein during an operating period of the vibration motor, the control unit controls the acceleration and deceleration of the vibration motor to make a rotating speed of the vibration motor alternately switched between a first rotating speed value and a second rotating speed value.
5. The driving circuit of claim 2, wherein the vibration motor does not have an eccentric structure, and during a start-up period of the vibration motor, the control unit controls the acceleration and deceleration of the vibration motor to make a rotating speed of the vibration motor gradually decreased to a target rotating speed value.
6. The driving circuit of claim 5, wherein the vibration motor is a fan.
7. The driving circuit of claim 1, further comprising:
   a plurality of driving switches, coupled between a power terminal of the vibration motor and the control unit:
   wherein the control unit controls the acceleration and deceleration of the vibration motor by controlling the driving switches according to the detecting result.
8. The driving circuit of claim 1, wherein the detecting result includes detected rotating positions corresponding to specific rotating angles of the vibration motor.
9. The driving circuit of claim 1, wherein the specific period is varied according to centroid of a base connected to the vibration motor.
10. The driving circuit of claim 1, wherein the difference between the normal operation mode and the vibration mode of the driving circuit is that at a second specific period, the driving circuit drives acceleration in the normal operation mode and the driving circuit drives deceleration with difference phase in the vibration mode.
11. The driving circuit of claim 10, wherein the second specific period is varied according to centroid of a base connected to the vibration motor.
12. The driving circuit of claim 1, wherein the difference between the normal operation mode and the vibration mode of the driving circuit is that at a third specific period, the driving circuit drives acceleration at a normal phase in the normal operation mode and the driving circuit drives acceleration at an early phase and a late phase to make use of the phase position that produces a vertical force in the vibration mode.
13. The driving circuit of claim 1, wherein the difference between the normal operation mode and the vibration mode of the driving circuit is that at a fourth specific period, the driving circuit drives acceleration at a normal phase in the normal operation mode and the driving circuit drives acceleration at an early phase and drives deceleration at a late phase to make use of the phase position to produce a vertical force in the vibration mode.
14. A driving circuit for a vibration motor, comprising:
   a detecting unit, coupled to the vibration motor, for detecting rotating position and rotating speed of the vibration motor and accordingly generating a detecting result; and
   a control unit, coupled to the detecting unit and the vibration motor, for controlling acceleration and deceleration of the vibration motor according to the detecting result;
   wherein the driving circuit has a normal operation mode and a vibration mode, the difference between the normal operation mode and the vibration mode of the driving circuit is that at a first specific period, the driving circuit drives acceleration at a normal phase in the normal operation mode and the driving circuit drives acceleration at an early phase and a late phase to make use of the phase position that produces a vertical force in the vibration mode.
15. The driving circuit of claim 14, wherein the difference between the normal operation mode and the vibration mode of the driving circuit is that at a second specific period, the driving circuit drives acceleration in the normal operation mode and the driving circuit drives deceleration in the vibration mode.

16. The driving circuit of claim 14, wherein the difference between the normal operation mode and the vibration mode of the driving circuit is that at a third specific period, the driving circuit drives acceleration in the normal operation mode and the driving circuit drives deceleration with difference phase in the vibration mode.

17. The driving circuit of claim 14, wherein the difference between the normal operation mode and the vibration mode of the driving circuit is that at a fourth specific period, the driving circuit drives acceleration at a normal phase in the normal operation mode and the driving circuit drives acceleration at an early phase and drives deceleration at a late phase to make use of the phase position to produce another vertical force in the vibration mode.

* * * * *